United States Patent [19]

Ditzer, Jr.

[11] 4,449,985

[45] May 22, 1984

[54] DYE COMPOSITIONS CONTAINING PARTIALLY HYDROLYZED POLYVINYL ESTER

[75] Inventor: Joseph R. Ditzer, Jr., Kingsport, Tenn.

[73] Assignee: Eastman Kodak Company, Rochester, N.Y.

[21] Appl. No.: 392,483

[22] Filed: Jun. 28, 1982

Related U.S. Application Data

[63] Continuation-in-part of Ser. No. 304,772, Sep. 23, 1981, abandoned.

[51] Int. Cl.$^3$ .............................................. D06P 67/00
[52] U.S. Cl. ........................................... 8/528; 8/527; 8/552; 260/158
[58] Field of Search ............................ 8/552, 527, 528

[56] References Cited

U.S. PATENT DOCUMENTS 3,967,922   7/1976   Wolf et al. .............................. 8/552

FOREIGN PATENT DOCUMENTS

55/132781   10/1980   Japan .
715170   9/1954   United Kingdom .

*Primary Examiner*—A. Lionel Clingman
*Attorney, Agent, or Firm*—Donald W. Spurrell; Daniel B. Reece, III

[57] ABSTRACT

Disclosed are compositions for use in preparing thickened thermosol dyeing baths or printing paste wherein natural or synthetic thickeners are employed, comprising an aqueous system of one or more substantially water insoluble dyes and from about 2 to about 12%, preferably from about 3 to about 10%, and most preferably 4 to about 8% by weight of polyvinyl alcohol (PVA). In general, the dyes useful in the present composition are disperse dyes as defined in the Color Index, 3rd Edition, as azo, anthraquinone, methine, nitroarylamine, and quinoline. Particularly useful are such dyes, for example, comprised of couplers selected from aniline, tetrahydroquinoline, benzomorpholine, and their known derivatives, and diazo components selected from phenyl, thiazolyl, isothiazole, thiadiazolyl, thienyl, benzothiazolyl, and benzisothiazolyl and their known derivatives. The present composition avoids problems associated with loss in viscosity as experienced when using ionic dispersing agents in thermosol dye baths and printing pastes.

8 Claims, No Drawings

DYE COMPOSITIONS CONTAINING PARTIALLY HYDROLYZED POLYVINYL ESTER

This is a continuation-in-part application of Ser. No. 304,772, filed Sept. 23, 1981 now abandoned.

This invention concerns novel disperse dye compositions and their use, particularly for application by the thermosol method employing natural or synthetic thickening agents to synthetic fibers and particularly polyester fibers or blends thereof with other synthetic or natural fibers.

In thermosol dyeing the dyes are applied from a bath or by padding to the fabrics from a paste, both of which are thickened by such materials as natural products such as starches dextrins, alginates, natural gums, gelatin, glue and casein, and synthetic materials such as salts of polyacrylic acid, polymethacrylic acid, or ethylene/maleic anhydride copolymers. When the dyes are dispersed in the bath or paste by common ionic dispersing agents such as sodium lignin sulfonate, a severe reduction in viscosity of the thermosol paste is often experienced, particularly when synthetic thickeners, are employed. Since the dyeing equipment and procedures are preset to handle certain viscosity compositions, the effect on dyeing quality can be disastrous, particulary in regard to uncontrolled dye migration and unevenness of shade.

The present invention avoids these problems by employing polyvinyl alcohol as the dispersing agent. This agent does not adversely affect viscosity of the thermosol bath or paste and allows the thickeners, particularly the synthetic ones, to function in their prescribed manner to prevent the aforesaid uncontrolled dye migration. The present invention gives improvements also in one or more properties in processing or in the final dyed product, such as brightness, sublimation fastness, dye exhaustion, random cloth spec, dispersion, build, light fastness, color fastness, wash, dry cleaning, solvent bleeding, crocking, and % dye fixation.

The invention in its broad sense is defined as a composition for use in preparing thickened thermosol dye baths or paste, comprising an aqueous system containing a total of from about 5% to about 30% by weight of one or more substantially water insoluble disperse dyes (disperse dye component) and from about 2% to about 12%, preferably 3% to about 10%, and most preferably 4% to about 8% by weight of polyvinyl alcohol (PVA).

More particularly, some of the useful azo dyes correspond to the formula D—N=N—C wherein D represents the radicals

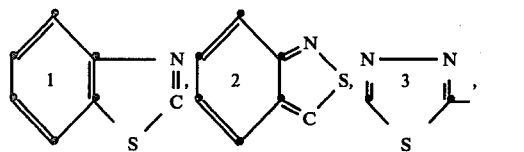

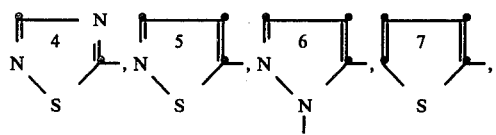

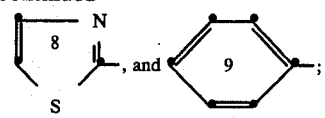

wherein ring 1 may have 1-3 substituents selected from alkyl, alkoxy, thiocyano, alkylthio, cyano, carbamoyl, alkylcarbamoyl, alkoxycarbonyl, acyl, alkylsulfonyl, sulfamoyl, SO₂NH(alkyl), SO₂N(dialkyl), alkylsulfonamido, acylamido, halogen, trifluoromethyl, and SO₃(aryl);

Ring 2 may have 1-3 substituents selected from alkyl, alkoxy, chlorine, bromine, SO₂NH₂, SO₂NH(alkyl), and SO₂N(dialkyl);

Ring 3 may have a substituent selected from alkyl, alkoxy, halogen, alkylsulfonyl, SO₂NH₂, SO₂NH(alkyl), SO₂N(dialkyl), arylsulfonyl, acylamido, aryl, arylthio, alkenylthio, cyclohexylthio, thiocyano, cyclohexylsulfonyl, alkylthio, and cyclohexyl;

Ring 4 may have a substituent selected from alkyl, aryl, halogen, alkylthio, cyclohexylthio, and alkylsulfonyl;

Ring 5 may have 1 or 2 substituents selected from alkyl, halogen, cyano, carbamoyl, CONH-alkyl, alkoxycarbonyl, alkylthio, alkenylthio, arylthio, cyclohexylthio, s-heterocycle, aryloxy, and alkoxy;

Ring 6 may have 1 or 2 substituents selected from alkyl, alkoxycarbonyl, alkylthio aryl, cyano, carbamoyl, alkylcarbamoyl, and alkylsulfonyl, and the hydrogen on the N may be replaced with alkyl, aryl of 6-10 carbons, alkylsulfonyl, arylsulfonyl, alkanoyl, or alkoxycarbonyl;

Ring 7 may be substituted with 1-3 groups selected from alkyl, cyano, alkoxycarbonyl, acyl, alkylsulfonyl, arylsulfonyl, carbamoyl, alkylcarbamoyl, aryl, halogen, sulfamoyl, alkylsulfamoyl, and formyl;

Ring 8 may have one or two substituents selected from alkyl, aryl, alkoxycarbonyl, carbonyl, CONH alkyl, CON(alkyl)₂, halogen, cyano, thiocyano, alkylthio, alkylsulfonyl, arylsulfonyl, formyl, acyl, and aroyl; and Ring 9 may have 1-3 substituents independently selected from alkyl, alkoxy, thiocyano, cyano, nitro, alkylthio, arylazo, arylthio, aroyl, carbamoyl, alkylcarbamoyl, alkanoyl, alkylsulfonyl, arylsulfonyl, sulfamoyl, SO₂NH(alkyl), SO₂N(dialkyl), alkylsulfonamido, alkanoylamino, halogen, trifluoromethyl, and SO₃(aryl); and C is a coupler selected from

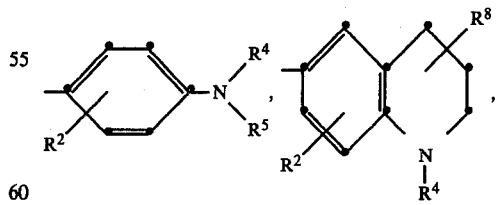

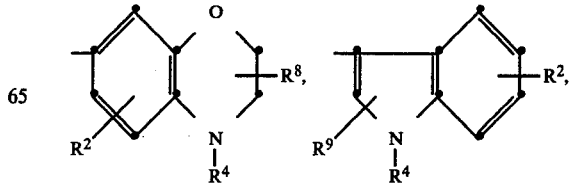

-continued

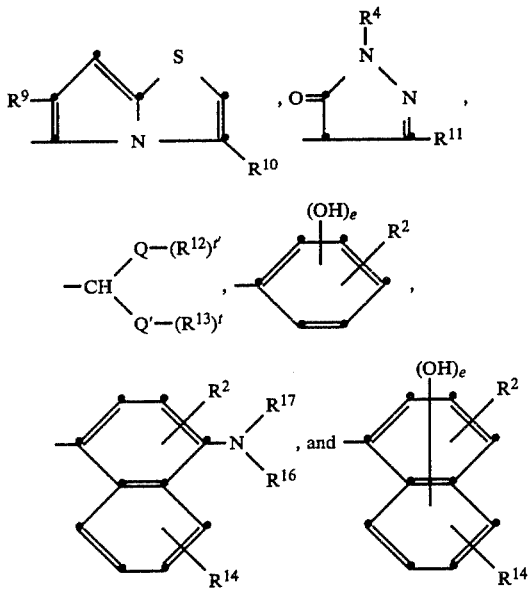

wherein

R² and R¹⁴ each represents up to three groups selected from hydrogen, fluorine, chlorine, bromine, alkyl, cycloalkyl, alkoxy, phenoxy, alkylthio, arylthio, and radicals having the formula —NH—X—R³ in which X is —CO—, —COO—, or —SO₂— and R³ is selected from alkyl and alkyl substituted with halogen, hydroxy, phenoxy, aryl, cyano, cycloalkyl, alkylsulfonyl, alkylthio, alkanoyloxy, and alkoxy, and when X is —CO—, R³ also is selected from hydrogen, amino, alkylamino, dialkylamino, arylamino, aryl, and furyl;

R⁴ and R⁵ are each selected from hydrogen, alkyl, aryl, cycloalkyl, and alkyl substituted with halogen, CN, OH, alkoxy, aryloxy, alkoxyalkoxy, alkanoyl, alkanoyloxy, carbamoyl, alkylcarbamoyl, sulfamoyl, alkylsulfamoyl, alkoxyalkanoyloxy, and cycloalkyl, and R⁴ and R⁵ together represent a single, combined group —CH₂CH₂CH₂CH₂CH₂—, —CH₂CH₂OCH₂CH₂—, —CH₂CH₂—S—CH₂CH₂—, or —CH₂CH₂—SO₂—CH₂CH₂—;

R⁸ represents one or two groups each selected from hydrogen, alkyl and alkyl substituted with —CN, alkoxy, alkoxycarbonyl, alkoxycarbonyloxy, phenyl, cyclohexoxy, —OH, —Cl and Br;

R⁹, R¹⁰ and R¹¹ are each selected from hydrogen, alkyl, phenyl, or phenyl substituted with 1–3 groups selected from Cl, Br, alkyl or alkoxy, alkylthio, benzylthio, cyclohexylthio and phenylthio;

Q and Q' are each selected from —CO—, —SO₂—, or —CN; R¹² and R¹³ are each selected from alkyl, hydroxyalkyl, alkoxy, alkoxycarbonylamino, trifluoromethyl, phenyl or phenyl substituted with 1–3 groups selected from Cl, Br, alkyl or alkoxy, alkoxycarbonylalkyl, cyanoalkyl, amino, haloalkyl, alkylamino, alkylthio, benzylthio, cyclohexylthio and phenylthio; and R¹² and R¹³ together comprise —CH₂C(CH₃)₂CH₂—, or 1,2—C₆H₄— connecting Q and Q';

R¹⁶ and R¹⁷ are selected from hydrogen, cycloalkyl, aryl, alkyl, and alkyl substituted with alkoxy, hydroxy, alkoxyalkoxy, hydroxyalkoxy, carbamoyl, sulfamoyl, alkanoylamino, or alkenylsulfonyl, and aryl substituted with hydroxyalkyl;

e is 1 or 2; t and t' are each 1 or zero;

and wherein each of the above alkyl, alkanoyl, alkylene, and alkoxy moieties may be substituted with one to three of the following: hydroxy; halogen; cyano; succinimido; glutarimido; phthalimido; 2-pyrrolidono; cyclohexyl; phenyl; phenyl substituted with alkyl, alkoxy, halogen, alkanoylamino, cyano or alkoxycarbonyl; alkanoylamino; sulfamoyl; alkylsulfamoyl; vinylsulfonyl; acrylamido; phthalimidinyl; benzoylsulfonicimidyl; alkylsulfonamido; phenylsulfonamido; alkoxycarbonyl—amino; alkylcarbamoyloxy; alkoxycarbonyl; alkoxycarbonyloxy;

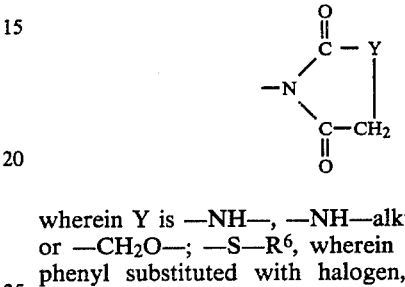

wherein Y is —NH—, —NH—alkyl—, —O—, —S—, or —CH₂O—; —S—R⁶, wherein R⁶ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

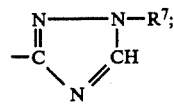

—OXR³; —NH—X—R³; —X—R³; —SO₂NR⁷R⁷; wherein R³ and X are as defined above and each R⁷ is selected from H and R³; alkoxy; alkoxy substituted with hydroxy, cyano, alkanoyloxy, or alkoxy; phenoxy; or phenoxy substituted with one or more of alkyl, alkoxy or halogen, and wherein the alkyl, alkylene, alkoxy, alkanoyl, and such hydrocarbon moieties of the diazo components and the couplers are straight or branched and contain from 1–6 carbons.

The PVA consists of polyvinyl ester, e.g., polyvinyl acetate, from about 70 to about 100% hydrolyzed, preferably above about 80% hydrolyzed, and most preferably from about 85% to about 90% hydrolyzed. The viscosity of the PVA ranges from about 2 to about 150 cps, preferably from about 3 to about 50 cps, and most preferably from about 4 to about 8 cps, as measured as a 4% aqueous solution in a Brookfield Viscometer, Model LVF (No. 1 spindle at 60 rpm at 20° C.). Such materials are well known to the art as shown, for example, in U.S. Pat. No. 3,218,183 and references cited therein. See also, Vinyl and Related Polymers, Calvin E. Schildknecht, John Wiley & Sons, Inc., 1952. Typical of these PVA materials are Elvanols sold by Du Pont, the VINOL materials sold by Air Products and Chemicals, and Gelvatols sold by Monsanto Chemical Co.

The synthetic thickeners and problems in the use thereof are described, for example, in I. W. Hughes, Journal of the Society of Dyers and Colourists V95, No. 11, p. 381, and preferred ones are ammoniated or NaOH neutralized polyacrylic acid, methacrylic acid, copolymers thereof, and ethylene/maleic acid (usually equimolar, employing maleic anhydride) copolymers. See, for example, Water-Soluble Resins, Davidson and Sittig, 2nd Ed., Reinholt Book Corp., New York, 1968. Typical are the Carbopol materials such as 846 sold by B. F. Goodrich. Also, other materials such as polyacrylamides are often used as seen from Chapter 9 of Acrylic Resins, Milton B. Horn, Reinhold Publishing Corp., N.Y., 1960. These thickeners typically have viscosities ranging between about 10,000 to about 60,000, and preferably 40,000 to about 50,000 cps as measured as a 2% aqueous solution in a Brookfield Viscometer as described above, and are prepared by conventional addition polymer processes such as disclosed in Acrylic Resins and Water-Soluble Resins, supra. For details of conventional thermosol dyeing and the intracacies of proper thickener selection, see Preparation and Dyeing of Synthetic Fibres, H. U. Schmidlin, Reinhold Publishing Corporation, N.Y., 1963, p. 280, et seq.

The present composition prior to its admixture with the thickener, typically but not critically contains in addition to the dye, PVA, and water, up to about 8% by weight total of any of a variety of additives commonly employed in the dye industry such as surfactants, minor amounts of ionic grinding aids such as sodium lignin sulfonate and the like, diluents such as ammonium or sodium sulfate, humectants, fungicides, and anti-foaming agents. Such dyeing assistants are known, e.g., as Nekal BX (sodium salt of dialkyl naphthalene sulfonic acid), Giv-Guard DNX (6-acetoxy-2,4-dimethyl-m-dioxane), Surfynol 104E (2,4,7,9-tetramethyl-5-decyn-4,7-diol) and Lomar D (sulfonated naphthalene condensate).

In the finished thermosol print paste the thickener comprises about 0.1–10% by wt. and preferably 1–3% by weight thereof, and in the final thermosol pad bath the thickener comprises about 0.01–1.5% by weight and preferably 0.05 to 1.0% by weight thereof.

In the finished thermosol print paste and pad bath, the present dye paste comprises about 0.5–10% by wt. and preferably 1.0–6.0% by weight thereof, depending in large measure, of course, on the concentration of dye in said dye paste, and other dyeing parameters and conditions.

The dyes to which the present invention is applicable also include those specifically disclosed, for example, in a number of U.S. Pat. such as Nos. 3,087,773; 3,201,415; 3,279,880; 3,106,438; 2,624,746; 2,537,975; 3,113,952; 3,254,078; 2,726,237; 3,336,285; 3,280,101; 3,272,791 and 3,349,076.

A typical dye paste composition of the present invention for use in making thickened thermosol pad baths or print paste, with ingredients in parts by weight, is as follows:

| | |
|---|---|
| 200.0 | Dye |
| 12.0 | Lomar D (grinding aid) |
| 1.44 | Giv-Gard DXN (fungicide) |
| 0.4 | Surfynol 104E (foam control) |
| 33.0 | Diethylene Glycol (humectant) |
| 98.0 | Polyvinyl Alcohol (approximately 85% hydrolyzed) |
| 850.0 | Water |

A typical thickened, thermosol print paste has the following composition in parts by weight:

| | |
|---|---|
| 2.0 | parts of above dye paste |
| 2.0 | parts of Carbopol 846 |
| 96.0 | parts of water |

The invention has been described in detail with particular reference to preferred embodiments thereof, but it will be understood that variations and modifications can be effected within the spirit and scope of the invention.

I claim:

1. A composition for use in preparing thickened thermosol dye baths or print paste, comprising an aqueous system of from about 5% to about 30% by weight of a substantially water insoluble disperse dye component and from about 2% to about 12% by weight of polyvinyl alcohol comprised of hydrolyzed polyvinyl ester.

2. The composition of claim 1 wherein the ester is above about 70% hydrolyzed.

3. The composition of claim 2 wherein the dye component is selected from those having a diazo moiety selected from phenyl, thiazolyl, isothiazolyl, thiadiazolyl, thienyl, benzothiazolyl, and benzisothiazolyl and their known derivatives, and a coupler moiety selected from aniline, tetrahydroquinoline, benzomorpholine, and their known derivatives.

4. The composition of claim 1 wherein the dye is selected from one or more of those of the formula D—N=N—C wherein D represents any of the radicals

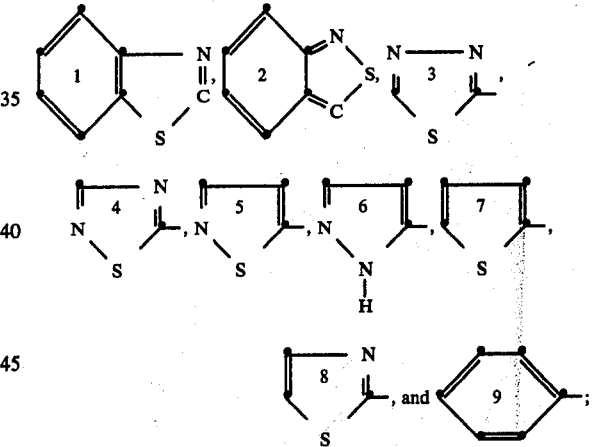

wherein
ring 1 may have 1–3 substituents selected from alkyl, alkoxy, thiocyano, alkylthio, cyano, carbamoyl, alkylcarbamoyl, alkoxycarbonyl, acyl, alkylsulfonyl, sulfamoyl, SO$_2$NH(alkyl), SO$_2$N(dialkyl), alkylsulfonamido, acylamido, halogen, trifluoromethyl, and SO$_3$(aryl);

Ring 2 may have 1—3 substituents selected from alkyl, alkoxy, chlorine, bromine, SO$_2$NH$_2$, SO$_2$NH(alkyl), and SO$_2$N(dialkyl);

Ring 3 may have a substituent selected from alkyl, alkoxy, halogen, alkylsulfonyl, SO$_2$NH$_2$, SO$_2$NH(alkyl), SO$_2$N(dialkyl), arylsulfonyl, acylamido, aryl, arylthio, alkenylthio, cyclohexylthio, thiocyano, cyclohexylsulfonyl, alkylthio, and cyclohexyl;

Ring 4 may have a substituent selected from alkyl, aryl, halogen, alkylthio, cyclohexylthio, and alkylsulfonyl;

Ring 5 may have 1 or 2 substituents selected from alkyl, halogen, cyano, carbamoyl, CONH-alkyl, alkoxycarbonyl, alkylthio, alkenylthio, arylthio, cyclohexylthio, s-heterocycle, aryloxy, and alkoxy;

Ring 6 may have 1 or 2 substituents selected from alkyl, alkoxycarbonyl, alkylthio, aryl, cyano, carbamoyl, alkylcarbamoyl, and alkylsulfonyl, and the hydrogen on the N may be replaced with alkyl, aryl of 6–10 carbons, alkylsulfonyl, arylsulfonyl, alkanoyl, or alkoxycarbonyl;

Ring 7 may be substituted with 1–3 groups selected from alkyl, cyano, alkoxycarbonyl, acyl, alkylsulfonyl, arylsulfonyl, carbamoyl, alkylcarbamoyl, aryl, halogen, sulfamoyl, alkylsulfamoyl, and formyl;

Ring 8 may have one or two substituents selected from alkyl, aryl, alkoxycarbonyl, carbonyl, CONH alkyl, CON(alkyl)$_2$, halogen, cyano, thiocyano, alkylthio, alkylsulfonyl, arylsulfonyl, formyl, acyl, and aroyl; and ;P0 Ring 9 may have 1–3 substituents independently selected from alkyl alkoxy, thiocyano, cyano, nitro, alkylthio, arylazo, arylthio, aroyl, carbamoyl, alkylcarbamoyl, alkanoyl, alkylsulfonyl, arylsulfonyl, sulfamoyl, SO$_2$NH(alkyl), SO$_2$N(dialkyl), alkylsulfonamido, alkanoylamino, halogen, trifluoromethyl, and SO$_3$(aryl); and C is a coupler selected from

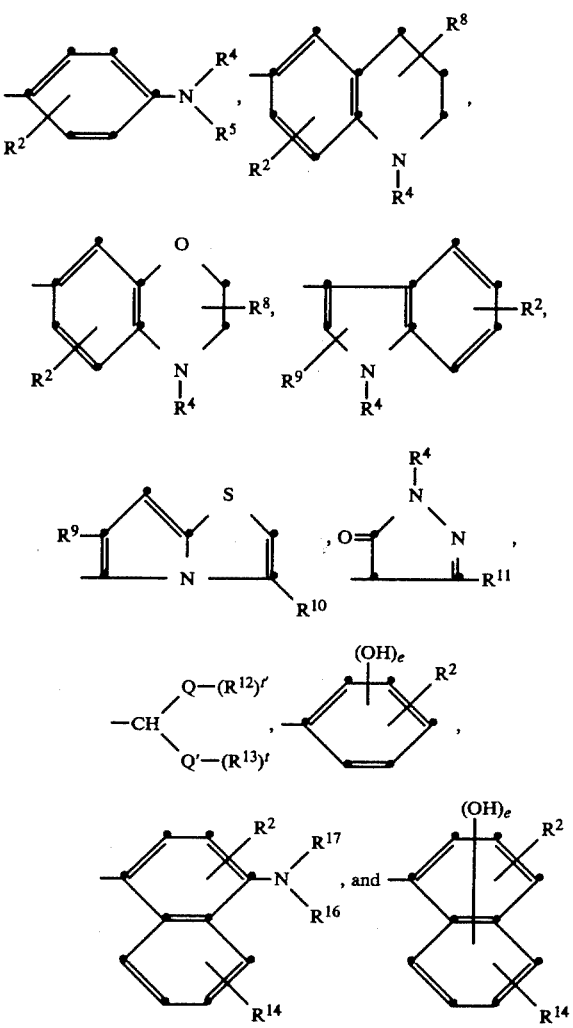

wherein

R$^2$ and R$^{14}$ each represents up to three groups selected from hydrogen, fluorine, chlorine, bromine, alkyl, cycloalkyl, alkoxy, phenoxy, alkylthio, arylthio, and radicals having the formula —NH—X—R$^3$ in which X is —CO—, —COO—, or —SO$_2$— and R$^3$ is selected from alkyl and alkyl substituted with halogen, hydroxy, phenoxy, aryl, cyano, cycloalkyl, alkylsulfonyl, alkylthio, alkanoyloxy, or alkoxy, and when X is —CO—, R$^3$ also is selected from hydrogen, amino, alkylamino, dialkylamino, arylamino, aryl, and furyl;

R$^4$ and R$^5$ are each selected from hydrogen, alkyl, aryl, cycloalkyl, and alkyl substituted with halogen, CN, OH, alkoxy, aryloxy, alkoxyalkoxy, alkanoyl, alkanoyloxy, carbamoyl, alkylcarbamoyl, sulfamoyl, alkylsulfamoyl, alkoxyalkanoyloxy, and cycloalkyl, and R$^4$ and R$^5$ together represent a single, combined group —CH$_2$CH$_2$CH$_2$CH$_2$CH$_2$—, —CH$_2$CH$_2$OCH$_2$CH$_2$—, —CH$_2$CH$_2$—S—CH$_2$CH$_2$—, or —CH$_2$CH$_2$—SO$_2$—CH$_2$CH$_2$—;

R$^8$ represents one or two substituents each selected from hydrogen, alkyl and alkyl substituted with —CN, alkoxy, alkoxycarbonyl, alkoxycarbonyloxy, phenyl, cyclohexoxy, —OH, —Cl or Br;

R$^9$, R$^{10}$ and R$^{11}$ are each selected from hydrogen, alkyl, phenyl, or phenyl substituted with 1–3 groups selected from Cl, Br, alkyl or alkoxy, alkylthio, benzylthio, cyclohexylthio and phenylthio;

Q and Q' are each selected from —CO—, —SO$_2$—, or —CN; R$^{12}$ and R$^{13}$ are each selected from alkyl, hydroxyalkyl, alkoxy, alkoxycarbonylamino, trifluoromethyl, phenyl or phenyl, substituted with 1–3 groups selected from Cl, Br, alkyl or alkoxy, alkoxycarbonylalkyl, cyanoalkyl, amino, haloalkyl, alkylamino, alkylthio, benzylthio, cyclohexylthio and phenylthio; and R$^{12}$ and R$^{13}$ together comprise —CH$_2$C(CH$_3$)$_2$CH$_2$—, or 1,2-C$_6$H$_4$— connecting Q and Q';

R$^{16}$ and R$^{17}$ are selected from hydrogen, cycloalkyl, aryl, alkyl, and alkyl substituted with alkoxy, hydroxy, alkoxyalkoxy, hydroxyalkoxy, carbamoyl, sulfamoyl, alkanoylamino, or alkenylsulfonyl, and aryl substituted with hydroxyalkyl;

e is 1 or 2; t and t' are each 1 or zero;

and wherein each of the above alkyl, alkanoyl, alkylene, and alkoxy moieties may be substituted with one to three of the following: hydroxy; halogen; cyano; succinimido; glutarimido; phthalimido; 2-pyrrolidono; cyclohexyl; phenyl; phenyl substituted with alkyl, alkoxy, halogen, alkanoylamino, cyano or alkoxycarbonyl; alkanoylamino; sulfamoyl; alkylsulfamoyl; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxycarbonyloxy;

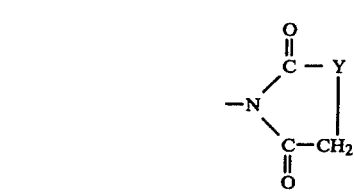

wherein Y is —NH—, —NH—alkyl—, —O—, —S—, or —CH$_2$O—; —S—R$^6$, wherein R$^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

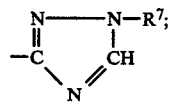

—OXR³; —NH—X—R³; —X—R³; —SO₂NR⁷R⁷; wherein R³ and X are as defined above and each R⁷ is selected from H and R³; alkoxy; alkoxy substituted with hydroxy, cyano, alkanoyloxy, or alkoxy; phenoxy; or phenoxy substituted with one or more of alkyl, alkoxy or halogen.

5. The composition of claim 1 wherein the dye is selected from those of the formulas

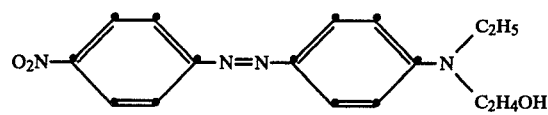

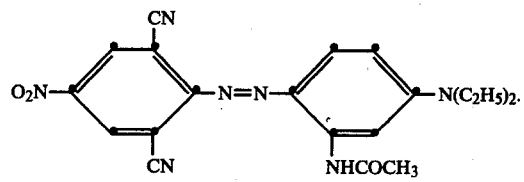

6. A thickened thermosol print paste or pad bath containing from about 0.5–10% by weight of the composition of claim 1.

7. The composition of claim 6 wherein the thickener is a salt of polyacrylic acid or copolymer of ethylene and maleic acid.

8. The composition of claim 6 wherein the viscosity of the thickener is from about 40,000 to about 50,000 cps.

* * * * *